United States Patent [19]

Partz

[11] Patent Number: 4,645,068
[45] Date of Patent: Feb. 24, 1987

[54] BONDING OF HIGHLY WEAR-RESISTANT PLATES, PARTICULARLY CERAMIC PLATES, TO A CARRIER TO BE PROTECTED AGAINST WEAR

[75] Inventor: Klaus-Dieter Partz, Leichlingen, Fed. Rep. of Germany

[73] Assignee: Klöckner-Humboldt-Deutz Aktiengesellschaft, Fed. Rep. of Germany

[21] Appl. No.: 744,256

[22] Filed: Jun. 13, 1985

[30] Foreign Application Priority Data

Jun. 14, 1984 [DE] Fed. Rep. of Germany ....... 3422097

[51] Int. Cl.$^4$ ........................ B23K 1/12; B65G 33/26
[52] U.S. Cl. .................................. 198/676; 228/122; 228/263.12
[58] Field of Search ............................ 228/122, 263.12; 384/279; 198/676

[56] References Cited

U.S. PATENT DOCUMENTS

| 3,549,337 | 12/1970 | Palmer | 228/122 X |
|---|---|---|---|
| 3,744,062 | 10/1973 | Brautigam | 198/676 |
| 3,897,624 | 8/1975 | Hamano | 228/122 |
| 4,251,018 | 2/1981 | Funk | 228/122 |
| 4,340,650 | 7/1982 | Pattanaik et al. | 228/263.12 |
| 4,410,285 | 10/1983 | Strasser et al. | 384/279 X |
| 4,466,533 | 8/1984 | Shwayder | 198/676 |
| 4,529,836 | 7/1985 | Powers et al. | 228/122 X |

FOREIGN PATENT DOCUMENTS 221365 8/1942 Switzerland .

Primary Examiner—Kenneth J. Ramsey
Attorney, Agent, or Firm—Hill, Van Santen, Steadman & Simpson

[57] ABSTRACT

The bonding of highly wear-resistant plates, particularly ceramic plates, to a carrier to be protected against wear, particularly the spiral of the conveyor worm of a screw-type centrifuge, has been achieved by welding or sintering. This, however, is relatively complicated and involves increased expenditures of time and cost. In accord with the invention, however, the connection or bonding of highly wear-resistant plates to a carrier to be protected against wear is improved and simplified in that a composite material (3) is thermally embedded between the highly wear-resistant plate (1) and the carrier (2).

5 Claims, 2 Drawing Figures

BONDING OF HIGHLY WEAR-RESISTANT PLATES, PARTICULARLY CERAMIC PLATES, TO A CARRIER TO BE PROTECTED AGAINST WEAR

BACKGROUND OF THE INVENTION

The invention relates to the connection or bonding of highly wear-resistant plates, particularly ceramic plates, to a carrier to be protected against wear, particularly the spiral or auger of a conveyor worm of the type used in a screw-type centrifuge.

Swiss Pat. No. 221 365 discloses shaped members for armoring (i.e., rendering wear-resistant) workpieces which are composed of an outside layer of wear-resistant material and a fastening layer, the two layers being bonded to one another by means of an intermediate layer of solid solution structure by welding or sintering to form a uniform member. This known way of forming and bonding the shaped member to the workpiece, however, is relatively complicated and involves an increased expense. This is particularly true because the shaped member must be subjected to a special treatment before it can be bonded to the workpiece.

SUMMARY OF THE INVENTION

An object of this invention therefore comprises the connection or bonding of highly wear-resistant plates, particularly ceramic plates, to a carrier to be protected against wear in an especially simple and cost-saving fashion.

This object is achieved by thermally embedding a composite material between the highly wear-resistant plate and the carrier. By thermally embedding the composite material between the highly wear-resistant plate and the carrier, a type of solid solution filler is formed between the highly wear-resistant plate and the carrier. This solid solution filler, on the one hand, firmly connects the highly wear-resistant plate to the carrier and, on the other hand, compensates for differences in thermal expansion between the highly wear-resistant plate and the carrier. The particular advantage of these inventive measures is found in that the highly wear-resistant plate can be firmly connected or bonded to the carrier to be protected against wear by means of simple brazing or soldering or the like without special pretreatment. The measures of the invention are therefore particularly suited for a firm and reliable connection or bonding of ceramic plates to the spiral or auger of the conveyor worm of a screw-type centrifuge.

A compressed metal which is a preferred composite consists of metallic chips (felt metal), for example of copper or chrome-nickel steel. Copper or chrome-nickel steel is a particularly preferred composite material which is introduced in felt metal form between the ceramic plate and the screw of the conveyor worm and which is heated to the respectively required sintering or melting temperature.

In a further development of the invention, the composite material of the invention can be very advantageously composed of a metallic multi-component material. It can thereby be particularly expedient in a further development of the invention to employ a composite material of compressed metal, particularly of copper or chrome-nickel steel.

In a method for the production of a firm connection or bonding of the highly wear-resistant plates to the carrier in accord with the invention, the composite material is embedded or positioned between brazing or soldering foils and a multi-component material is formed between the wear-resistant plate and the carrier by heating.

DESCRIPTION OF THE PREFERRED EMBODIMENT

Figure 1:
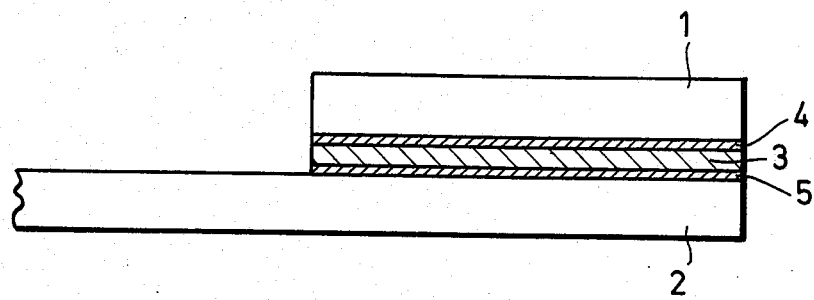
FIG. 1 shows a wear-resistant plate and a carrier plate before the firm connection or bonding.
Figure 2:
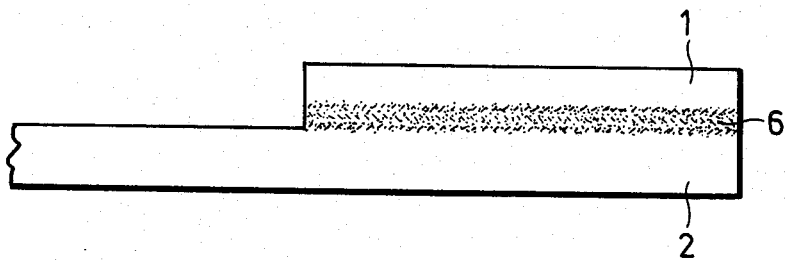
FIG. 2 shows the highly wear-resistant plate and the carrier plate of FIG. 1 after the firm connection or bonding.

As FIG. 1 shows, a composite material 3 between solder foils 4 and 5 is embedded or positioned between a highly wear-resistant plate 1, for example a ceramic plate, and a carrier 2, for example the conveyor worm spiral of a screw-type centrifuge. The composite material 3 with the solder foils 4 and 5 is embedded or positioned between the highly wear-resistant plate 1 and the carrier 2 is deformed by heating to, for example, 800° to 900° C. into a connection or bonding 6 shown in FIG. 2. The composite material can thereby be very advantageously composed either of a metallic multi-component material, thus, for example, of felt metal, particularly of copper or chrome-nickel steel. However, it can also be practical under given conditions to employ a composite material composed of porous material, for example sintered metal. Further, it is also possible to utilize a composite material formed of metal fabric for the firm connection or bonding of the highly wear-resistant plate 1 to the carrier plate. Under given conditions, plastic, synthetic resin or the like can be employed as composite material.

Given the employment of compressed metal, it is particularly expedient to use a compressed metal having a high pore volume or sintered metal in order to thereby achieve a particularly good bonding between the solder and the compressed metal. The layer thickness of the metallic composite material is dependent on the demands of the ceramic-metal combination.

The connection of the highly wear-resistant plate 1 to the carrier 2 with the assistance of the composite material of the invention can be undertaken by means of one-time heating (i.e., simultaneously) or by means of step-wise heating (i.e., brazing or soldering upon employment of brazeses or solders having radically different working temperatures).

In that a composite material is thermally embedded between the highly wear-resistant plate 1 and the carrier 2 in accord with the invention, the mutual wetting and bonding between the highly wear-resistant plate and the carrier is enabled, on the one hand, and on the other hand, the greatly different, thermal expansions of ceramic and metal can be accommodated in the composite material.

Moreover, the inventive bonding of the highly wear-resistant plate to the carrier plate is also distinguished in that the highly wear-resistant plate can be secured to arbitrary carriers in situ in a simple fashion.

Although the invention has been described with respect to preferred embodiments, it is not to be so limited as changes and modifications can be made which are within the full intended scope of the invention as defined by the appended claims.

I claim as my invention:

1. An article of manufacture comprising in combination:
   an outer highly wear-resistant ceramic plate for forming the outer edge surface of a helix of a screw conveyor;
   an inner metal helix carrier member for forming the supporting structure for said plate; and
   an intermediate composite joining layer coextensive with the facing surfaces of said inner member and said wear-resistant plate comprised of metal particles thermally embedded between solder foils and bonded to the facing surfaces of said plate and carrier member.

2. An article of manufacture constructed in accordance with claim 1:
   wherein said metal particles are chrome-nickel steel.

3. An article of manufacture constructed in accordance with claim 1:
   wherein the layer of metal particles is porous.

4. A method of bonding a wear-resistant ceramic plate for forming the outer edge surface of the helix of the screw conveyor to an inner metal helix carrier member for forming the supporting structure for said plate comprising the steps:
   providing an intermediate composite joining layer coextensive with the inner facing surfaces of said inner member and said wear-resistant plate including metal particles thermally embedded between solder foils wherein the ceramic plate, the carrier member and the intermediate composite joining layer are heated at temperatures effective to form the intermediate layer and bond the intermediate layer to said plate and member.

5. A method of bonding a wear-resistant ceramic plate for forming the outer edge surface of the helix of the screw conveyor to an inner metal helix carrier member for forming the supporting structure for said plate in accordance with the steps of claim 4:
   wherein heating is applied in the temperature range of between 800° C. to 900° C.

* * * * *